United States Patent
Chen et al.

(10) Patent No.: US 10,691,723 B2
(45) Date of Patent: Jun. 23, 2020

(54) DISTRIBUTED DATABASE SYSTEMS AND METHODS OF DISTRIBUTING AND ACCESSING DATA

(71) Applicant: HUAWEI TECHNOLOGIES CO., LTD., Shenzhen (CN)

(72) Inventors: Yuanxi Chen, Aurora (CA); Robin Grosman, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 742 days.

(21) Appl. No.: 15/146,007

(22) Filed: May 4, 2016

(65) Prior Publication Data
US 2017/0322995 A1 Nov. 9, 2017

(51) Int. Cl.
| | | |
|---|---|---|
| *G06F 16/27* | (2019.01) | |
| *G06F 16/215* | (2019.01) | |
| *G06F 16/22* | (2019.01) | |
| *G06F 16/21* | (2019.01) | |
| *H04L 12/26* | (2006.01) | |
| *H04L 29/08* | (2006.01) | |

(52) U.S. Cl.
CPC .......... *G06F 16/278* (2019.01); *G06F 16/215* (2019.01); *G06F 16/217* (2019.01); *G06F 16/221* (2019.01); *H04L 43/16* (2013.01); *H04L 67/10* (2013.01)

(58) Field of Classification Search
CPC ................................................. G06F 17/30584
USPC .......................................................... 707/609
See application file for complete search history.

(56) References Cited

U.S. PATENT DOCUMENTS

| | | | | |
|---|---|---|---|---|
| 7,395,537 | B1* | 7/2008 | Brown | G06F 16/217 718/104 |
| 7,447,681 | B2 | 11/2008 | Lightstone et al. | |
| 9,104,745 | B1 | 8/2015 | Gutti et al. | |
| 2003/0093408 | A1* | 5/2003 | Brown | G06F 16/2272 707/999.002 |
| 2006/0026179 | A1* | 2/2006 | Brown | G06F 16/217 707/999.1 |

(Continued)

FOREIGN PATENT DOCUMENTS

| | | | |
|---|---|---|---|
| CN | 103092916 A | 5/2013 | |
| CN | 103226610 A | 7/2013 | |

OTHER PUBLICATIONS

Data Redistribution—IBM DB2 Version 9.7 for Linux, UNIX, and Windows, not dated, accessed Apr. 5, 2016.

*Primary Examiner* — Pierre M Vital
*Assistant Examiner* — Andrew N Ho
(74) *Attorney, Agent, or Firm* — Slater Matsil, LLP

(57) ABSTRACT

A database system comprises a plurality of servers with data storage. The system holds first and second database tables. Records of the first database table are distributed among the servers according to values of a first distribution column. The servers can receive access requests and log workload data representative of the requests. Based on the workload data, the servers can determine a performance impact associated with columns of the tables and, upon determining that a performance impact associated with one of the columns is greater than a performance impact associated with the first distribution column, the servers can re-distribute the records among the plurality of servers according to values of the second column.

20 Claims, 13 Drawing Sheets

(56) References Cited

U.S. PATENT DOCUMENTS

| | | | |
|---|---|---|---|
| 2006/0242102 A1* | 10/2006 | Bruno | G06F 16/22 |
| | | | 707/999.001 |
| 2009/0037427 A1* | 2/2009 | Hazlewood | G06F 16/278 |
| | | | 707/999.01 |
| 2012/0310986 A1* | 12/2012 | Frantz | G06F 16/284 |
| | | | 707/792 |
| 2013/0346365 A1* | 12/2013 | Kan | G06F 3/061 |
| | | | 707/610 |
| 2014/0012810 A1* | 1/2014 | Chen | G06F 16/27 |
| | | | 707/610 |

* cited by examiner

DISTRIBUTED DATABASE SYSTEMS AND METHODS OF DISTRIBUTING AND ACCESSING DATA

FIELD

The following application relates to databases, and in particular to data distribution in distributed databases.

BACKGROUND

In large databases, data may be divided amongst storage devices connected to multiple nodes. Such databases, having storage devices connected to multiple nodes, may be referred to as distributed databases.

Distributed databases may provide for improved performance, since access requests can be handled by multiple machines. In addition, distributed databases may be expanded relatively easily and may provide for improved fault tolerance in the event of component failure. Moreover, distributed databases may be constructed using multiple relatively low-cost servers and storage devices, which may be less costly than a single centralized server with equivalent capacity.

Data may, for example, be distributed among nodes of a distributed database by hashing, ranging or round robin on particular fields or columns. A given distribution scheme may allow for efficient execution of some access requests, but may reduce performance for other access requests.

Typically, a distribution scheme may be designed by a database administrator (DBA) to suit an anticipated workload of the database. For example, a database administrator may attempt to distribute data in a manner likely to allow efficient execution of common access requests.

Unfortunately, the data stored in a database, as well as the workload experienced by the database, may change over time. For example, new data sets may be added to a database or new applications may be deployed for accessing the database. Such changes may render existing distribution schemes inefficient.

SUMMARY

An example database system comprises: a plurality of servers each having interconnected data storage; first and second database tables, the first database table having records comprising a plurality of columns, the records distributed among the plurality of servers according to values of a first distribution column; the servers configured to: receive requests to access data in the first and second database tables and log workload data representative of the requests; based on the workload data, determine a performance impact associated with ones of the plurality of columns; upon determining that a performance impact associated with a second one of the columns is greater than a performance impact associated with the first distribution column, re-distribute the records among the plurality of servers according to values of the second column.

The servers may be configured to re-distribute records only if the performance impact associated with the second column is greater than the performance impact associated with the first distribution column by more than a threshold value.

The threshold value may be based on a resource cost of re-distributing a table among the plurality of servers.

The threshold value may be user-adjustable.

The database system may comprise a workload log containing resource cost data and frequency data associated with requests to access data in the tables, wherein the performance impact is derived from the cost data and frequency data.

The servers may be configured to break the first data table into a plurality of partitions and re-distribute the records partition-by-partition.

The servers may be configured to receive a request to access the first table while re-distributing the first table, and to direct the request to a cache copy of one of the partitions.

The servers may be configured to maintain a read-only copy of each partition while re-distributing records of that partition.

The database system may comprise a priority queue of instructions to re-distribute tables of the database.

The servers may be configured to delay re-distributing records until a period of low system load.

Embodiments may incorporate the above features in any combination.

An example method of re-distributing database tables among a plurality of servers comprises: receiving requests to access data in first and second database tables, the first database table having records comprising a plurality of columns, the records distributed among a plurality of servers according to values in a first column; writing workload data to a log, the workload data representative of the requests; based on the workload data, determining a performance impact associated with ones of the plurality of columns; upon determining that a performance impact associated with a second one of the columns is greater than a performance impact associated with the first distribution column, re-distributing the records among the plurality of servers according to values of the second column.

The method may comprise re-distributing the records only if the performance impact associated with the second column is greater than the performance impact associated with the first distribution column by more than a threshold value.

The threshold value may be based on a resource cost of re-distributing a table among the plurality of servers.

The method may comprise receiving a user input to adjust the threshold value.

The method may comprise writing workload data to a workload log, the workload data comprising resource cost data and frequency data associated with data access requests.

The method may comprise deriving the performance impact data from the cost data and frequency data.

The method may comprise breaking the first data table into a plurality of partitions and re-distribute the records partition-by-partition.

The method may comprise receiving a request to access the first table while re-distributing the first table, and to direct the request to a cache copy of one of the partitions.

The method may comprise maintaining a read-only copy of each partition while re-distributing records of that partition.

The method may comprise writing a re-distribution instruction into a priority queue. Embodiments may include the above features in any combination.

Other aspects of the present disclosure will be apparent from the detailed description and figures.

DETAILED DESCRIPTION

Figure 1:
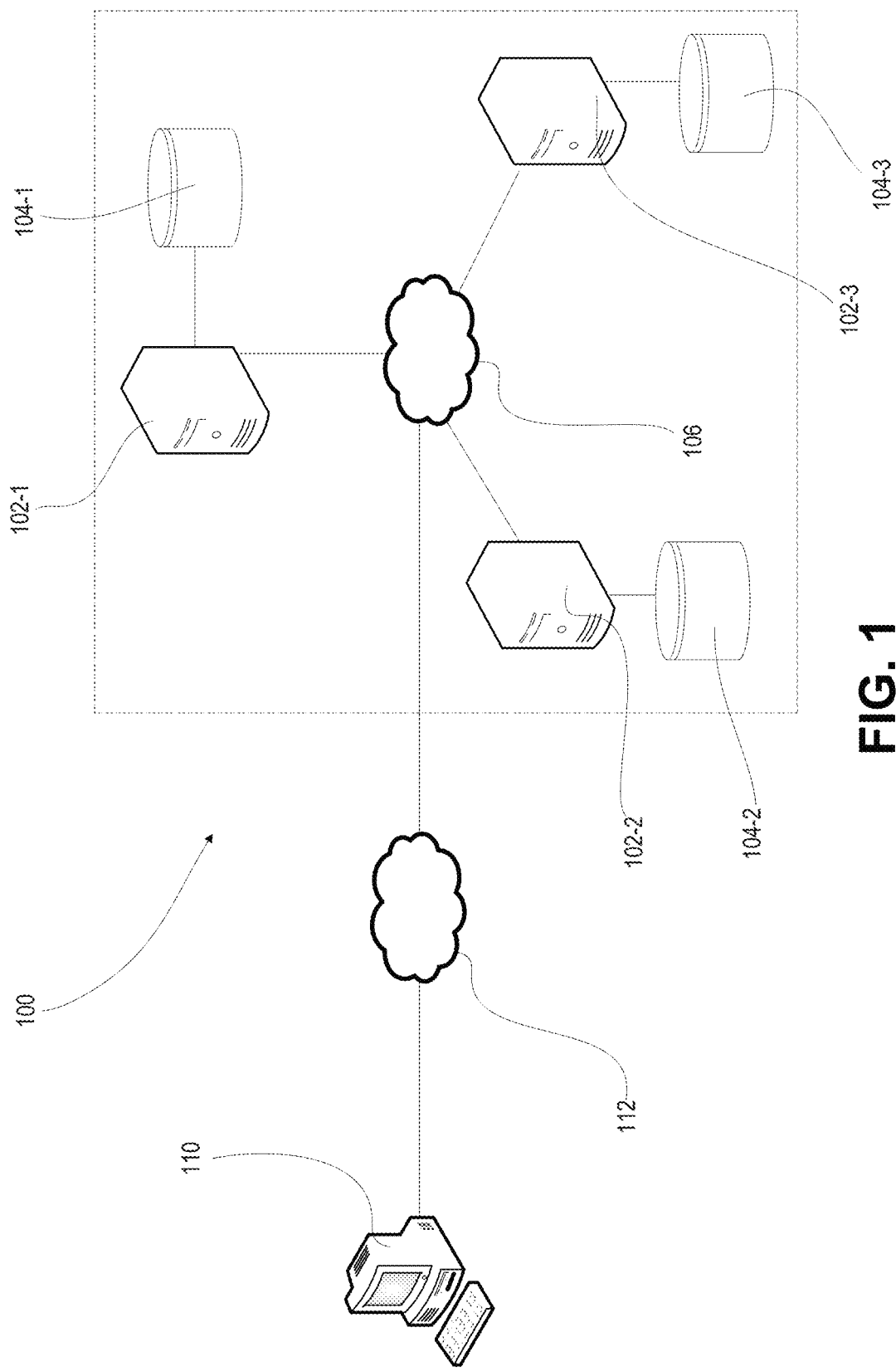
FIG. 1 is a block diagram of a database system and client computing device.

FIG. 1 depicts an example database system 100. Database system 100 includes a plurality of servers 102, each with interconnected data storage 104. Servers 102 may be interconnected via a network 106, which may be an IPv4, IPv6, X.25, IPX compliant or similar network, including one or more wired or wireless access points. Network 106 may be a local-area network (LAN) or a wide-area network (WAN), such as the internet, and may be connected with other communications networks, such as GSM/GPRS/3G/4G/LTE networks. Each server 102 may host database data in its interconnected data storage 104. As depicted, database system 100 includes 3 servers 102-1, 102-2, 102-3 (individually and collectively, servers 102), each with a respective data storage 104-1, 104-2, 104-3 (individually and collectively, data storage 104). However, in other embodiments, more or fewer servers 102 and data storage 104 may be present.

As will be described in further detail below, each of servers 102-1, 102-2, 102-3 and the associated storage 104-1, 104-2, 104-3 may form a node of database system 100. Servers 102-1, 102-2, 102-3 and their associated storage 104-1, 104-2, 104-3 may collectively host a database, with a portion of the database stored at each node.

Servers 102-1, 102-2, 102-3 may be physically separate machines, which may be located remotely from one another. Alternatively, servers 102-1, 102-2, 102-3 may be separate server instances running on a single machine. For example, servers 102-1, 102-2, 102-3 may be virtual machines or may be run on separate drives or partitions.

Database system 100 may be accessible by one or more client computing devices 110. Client computing devices 110 may be connected directly to network 106, or may be connected to network 106 by way of another network 112, which may be a LAN or a WAN such as the internet. Client computing devices 110 may be, for example personal computers, smartphones, tablet computers, or the like, and may be based on any suitable operating system, such as Microsoft Windows, Apple OS X or iOS, Linux, Android, or the like.

Figure 2:
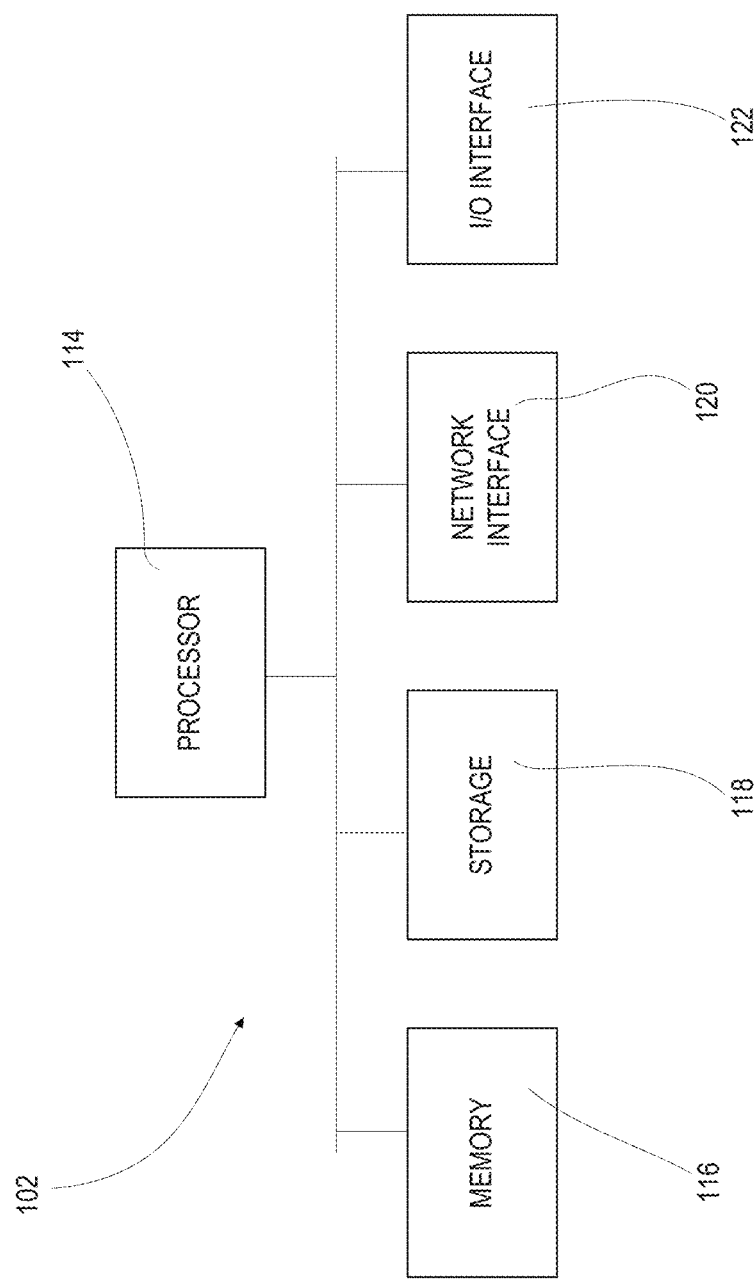
FIG. 2 is a block diagram of a server of the database system of FIG. 1.

FIG. 2 is a block diagram of components of an example server 102. As depicted, each server 102 includes a processor 114, memory 116, persistent storage 118, network interface 120 and input/output interface 122.

Processor 114 may be an Intel or AMD x86 or x64, PowerPC, ARM processor, or the like. Processor 114 may operate under control of software loaded in memory 116. Network interface 120 connects server 102 to network 106. I/O interface 122 connects server 102 to storage 104 and may further connect server 102 to one or more peripherals such as keyboards, mice, USB devices, disc drives, and the like.

Software may be loaded onto server 102 from peripheral devices or from network 106. Such software may be executed using processor 114.

Figure 3:
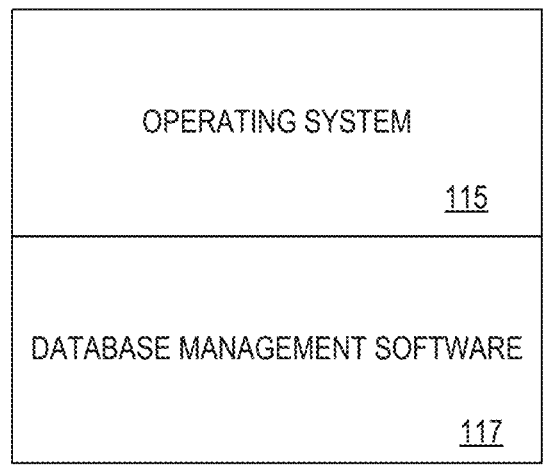
FIG. 3 is a diagram of software at the server of FIG. 2.

FIG. 3 depicts a simplified arrangement of software at a server 102. The software may include an operating system 115 and application software, such as database management system 117. Database management system may be a system configured for compatibility with the relational database model using a language such as SQL.

Figure 4:
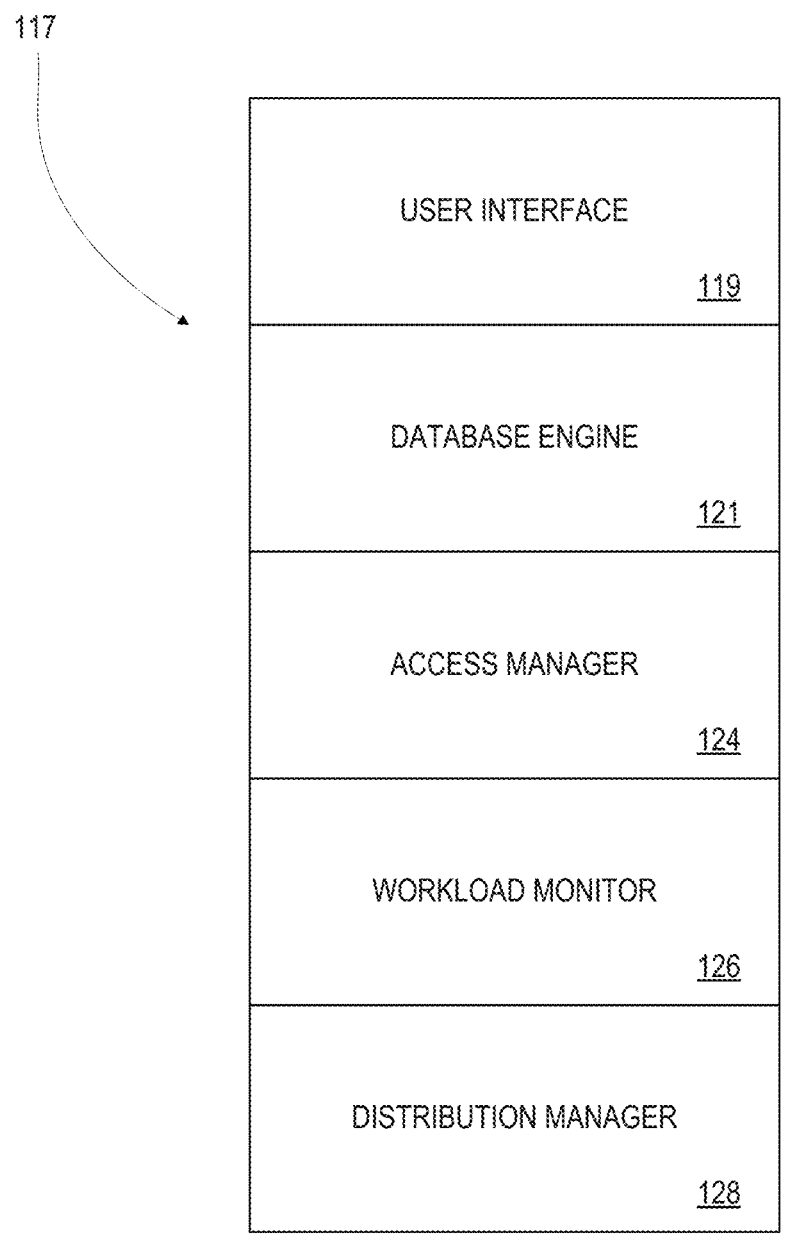
FIG. 4 is a diagram of components of the software of FIG. 3.

Database management system 117 may itself have a number of components, as depicted in FIG. 4. For example, database management system 117 may include a user interface 119, a database engine 121, An access manager 124, a workload monitor 126 and a distribution manager 128. Instances of database management system at different servers 102 may communicate with one another, for example, to send and receive instructions or data.

Figure 5A:
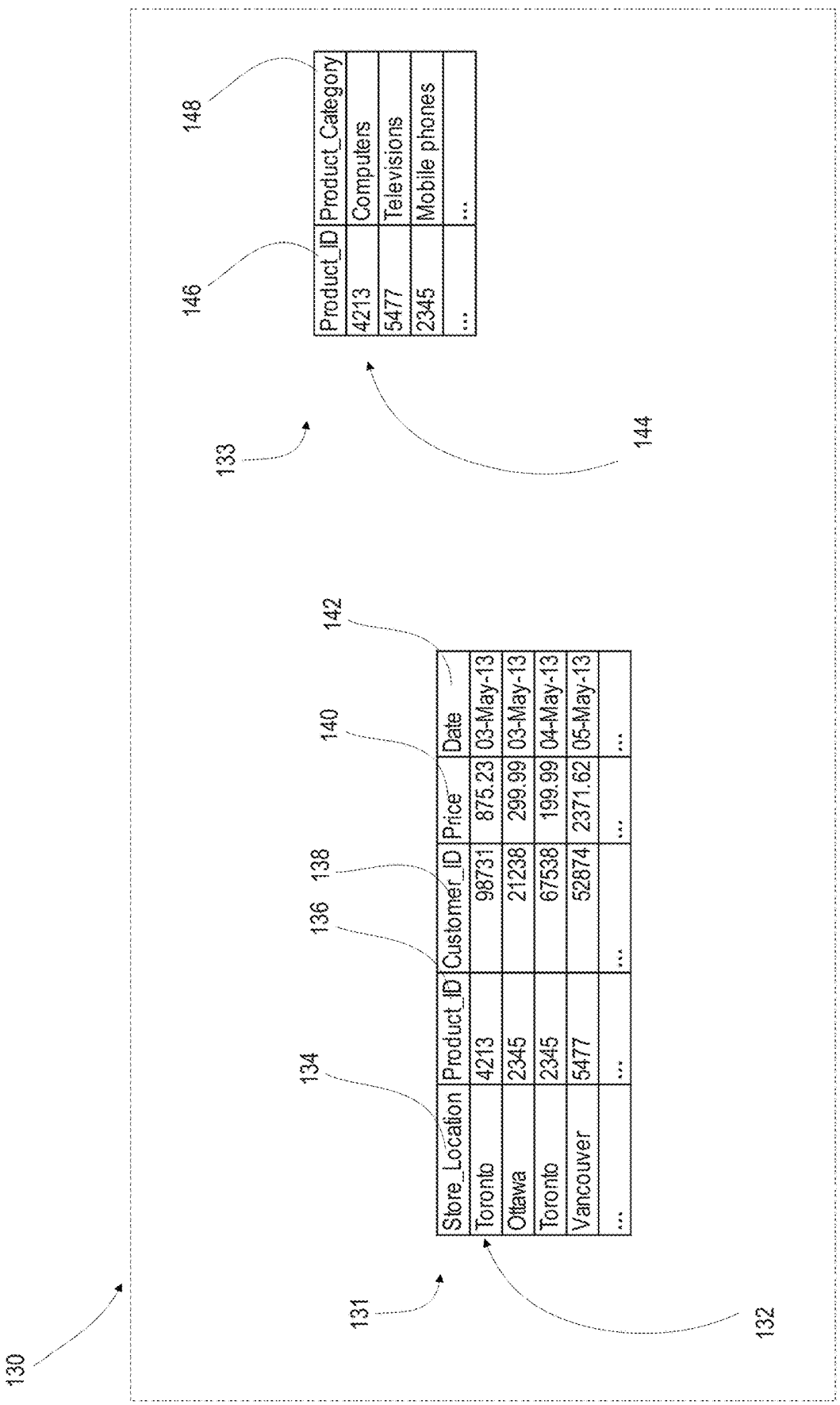
FIG. 5A is a schematic diagram of a database and database tables of the database system of FIG. 1.

Database management system 117 may maintain a database 130 in storage 104, e.g. a relational database comprising one or more tables with fields in columnar format. FIG. 5A depicts example tables of database 130. Database engine 121 may allow database management system 117 to access the database 130 for the purpose of reading, creating, deleting, updating records and the like. As used herein, references to columns or rows of database 130 may relate to columns or rows of tables within database 130. References herein to performing operations (e.g. ordering, sorting, distributing) based on a column mean performing those operations based on values of a field stored in that column. In other embodiments, database 130 may be another type of database, such as a document-oriented database or an object-oriented database. In such embodiments, database records may correspond to documents or objects, respectively. Columns may correspond to data fields in the objects or records. Rows may likewise correspond to documents or objects, such that references to ordering of rows may instead relate to ordering of documents or objects.

As depicted, database 130 includes tables 131, 133. Table 131 includes a plurality of records 132 of sales data. Each record 132 contains values in a number of fields arranged in columns. As depicted, the values are associated with a sales transaction and may include values in a Store_Location column 134, Product_ID column 136, a Customer_ID column 138, a price column 140, and a Date column 142.

Table 133 includes a plurality of records 144 of product data, in fields arranged as columns. Each record 144 includes values in a Product_ID column 146 and a Product_Category column 148.

Database 130 may have more or fewer tables containing more or fewer columns than depicted and may contain information other than sales and product information.

Figure 5B:
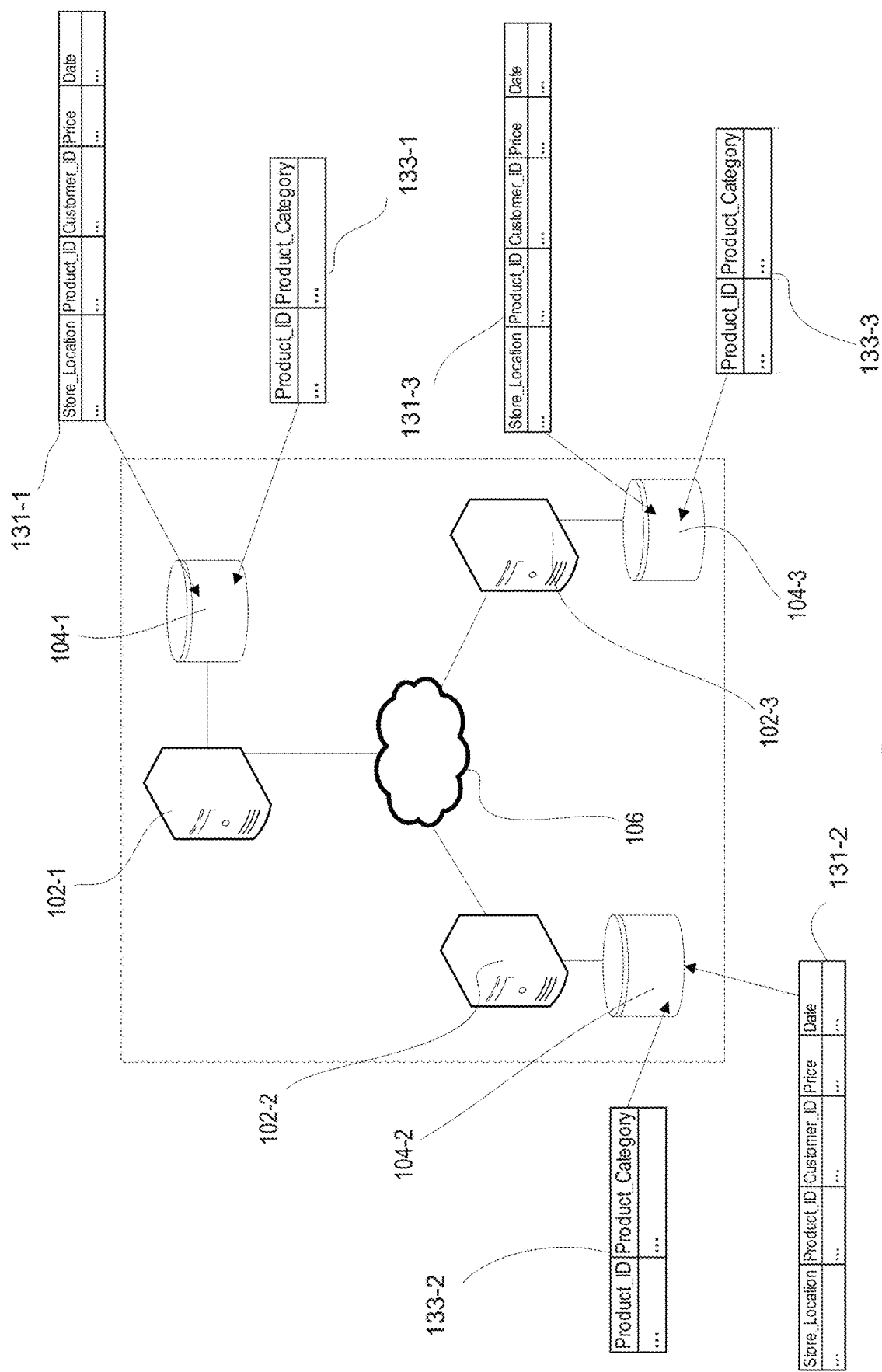
FIG. 5B is a block diagram representative of distribution of data in the database system of FIG. 1.

Tables 131, 133 may in turn be split among servers 102-1, 102-2 and 102-3. For example, as depicted in FIG. 5B, table 131 is divided into three portions 131-1, 131-2, 131-3 stored in storage 104-1, 104-2, 104-3 of servers 102-1, 102-2, 102-3, respectively. Likewise, table 133 is divided into three portions 133-1, 133-2, 133-3 stored in storage 104-1, 104-2, 104-3 of servers 102-1, 102-2, 102-3, respectively. Thus, as depicted, each of servers 1-3 stores a portion of each one of tables 131, 133. In other embodiments, one or more servers 102 May store portions of only a subset of tables. In some embodiments, tables 131, 133 may be divided into more or fewer portions, stored on more or fewer servers.

Division of tables 131, 133 may be determined by distribution manager 124. In some embodiments, tables 131, 133 may be distributed based on values in one or more columns. For example, tables 131, 133 may be distributed based on values of Product_ID columns 136, 146, such that each table portion 131-1, 131-2, 131-3, 133-1, 133-2, 133-3 contains rows with Product_ID values in a specific range. Each of tables 131, 133 may alternatively be distributed on any other column. As used herein, the term "current distribution columns" refers to the columns on which database tables are distributed at a particular time.

In some embodiments, tables may be distributed based on hashed values of one or more columns. That is, hash values may be calculated from values in one or more particular columns using a hash function, and rows may be distributed based on those hash values, such that each table portion contains rows having hash values within a specific range. The hash values may be appended to the tables or table portions. In other embodiments, tables 131, 133 may be distributed in a round-robin fashion. That is a first row of table 131 may be placed in portion 131-1, a second row may be placed in portion 131-2, and a third row may be placed in portion 131-3, etc.

User interface 119 may be configured to receive requests for accessing data in database 130 and to return results. User interface 119 may be presented locally at server 102 for operation by a user. Alternatively, or additionally, user interface 119 may be presented remotely, e.g., through a web browser or application at a client computing device 110.

Requests entered through user interface 119 may include record insertion, deletion or update, and queries requiring selection of data based on one or more columns. For example, a user may request all sales records and associated product categories. User interface 119 may be operable to receive instructions from a user, e.g., by text entry or using a graphical menu, and convert those instructions to a database language, such as SQL. In the SQL language, such a query may be as follows:

SELECT*WHERE
    *T*131.Product_ID=*T*133.PRODUCT_ID    (Query 1)

Where T131.PRODUCT_ID represents the Product_ID column 136 of table 131 and T133.PRODUCT_ID represents the Product_ID column 146 of table 133. Such a request may be referred to as a JOIN operation.

Access requests received by database system 100 may be parsed in order to determine whether a given request requires data from one or more of servers 102-1, 102-2, 102-3. Some requests may only require data from one server. Other requests may require data from multiple servers. Still other requests may require comparisons of data at different servers.

Access manager 124 may maintain a record of the distribution of tables 131, 133. That is, access manager 124 may maintain a record of the columns on which tables 131, 133 are distributed and the ranges present at each of servers 102. Thus, for a given access request, access manager 124 may be operable to determine which servers 102 will need to send or receive records and to direct servers 102 accordingly.

If tables 131, 133 are distributed on Product_ID columns 136, 146 such that each server 102-1, 102-2, 102-3 holds similar Product_ID ranges of each table 131, 133, Query 1 may be executed relatively efficiently. For any given Product_ID value of table 131, the record of table 133 with the same Product_ID value may be stored at the same server 102. Thus, access manager 124 may push the query to each server 102-1, 102-2, 102-3 so that each respective server 102 performs a comparison of locally-stored Product_ID values in tables 131, 133. Little or no network traffic may need to be transmitted in order to complete the query.

Conversely, if table 133 was distributed based on Product_Category column, running such a query may be less efficient and more resource-intensive. For example, table 133 could be distributed based on the Product_Category column 148 such that each server 102 contains only records for a particular product category. In other words, server 102-1 may contain only records having product category "Computers". In order to compare values, each row of table 133 may need to be transmitted to the server 102 holding rows of table 131 in the corresponding Product_ID range.

Access manager 124 would direct servers 102 to exchange records of table 133. Specifically, in order to make the relevant comparisons of values, access manager 124 may direct servers 102 to exchange records 144 of table 133 so that each record 144 is received at the server 102 holding the corresponding range of table 131 to determine any matching rows. Most or all rows of table 133 may need to be transmitted from one server 102 to another. Therefore, the amount of network traffic created by such operations may approach the size of table 133.

In still other examples, if both tables 131 and 133 were distributed based on columns other than Product_ID, Query 1 may run even less efficiently. For any given record of table 131 or 133, the corresponding record of the other table could be located at an unknown one of servers 102. Thus, in order to identify matching records, one of tables 131, 133 (typically, the smaller of the two) may need to be transmitted in its entirety to each one of servers 102 for a row-by-row comparison against each portion of the other table.

For example, if table 131 was distributed based on Date column 140 and table 133 was distributed based on Product_Category column 148, any given record of table 133 may match to a record of table 131 stored at an unknown one of servers 102. Thus, to perform the relevant comparisons, the row may need to be transmitted to each one of servers 102-1, 102-2, 102-3 for comparison to each one of table portions 131-1, 131-2, 131-3. Therefore, access manager 124 may direct each server 102 to transmit its respective portion of table 133 to all other servers 102. The total network traffic created by such transmissions may be approximately the product of the size of table 133 and the number of servers 102.

As will be apparent, requests to access data in database 130 may be executed most efficiently if the data access requests are based on the same columns on which tables 131, 133 are distributed. As used herein, the combination of tables and columns used for an access request may be referred to as the "search columns".

Conversely, if an access request is defined only partially in terms of columns on which tables are distributed, execution may be slower and network traffic may be correspondingly higher.

If an access request is defined entirely in terms of columns other than those on which tables are distributed, execution may be still slower and network traffic still higher. Therefore, it may be desirable to distribute tables 131, 133 on the columns most frequently used in access requests.

Access requests received by database management system 117 may be logged by workload monitor 126. In particular, workload monitor 126 may maintain a log of the number and frequency of access requests, and criteria associated with such requests. For example, workload monitor 126 may log each combination of tables and columns used for access requests. Workload monitor 126 may also log the frequency of such requests and the cost (e.g. execution time and bandwidth consumption) of such requests. As used herein, the "workload" of a database refers to the set of requests for access to the database.

Figure 6:
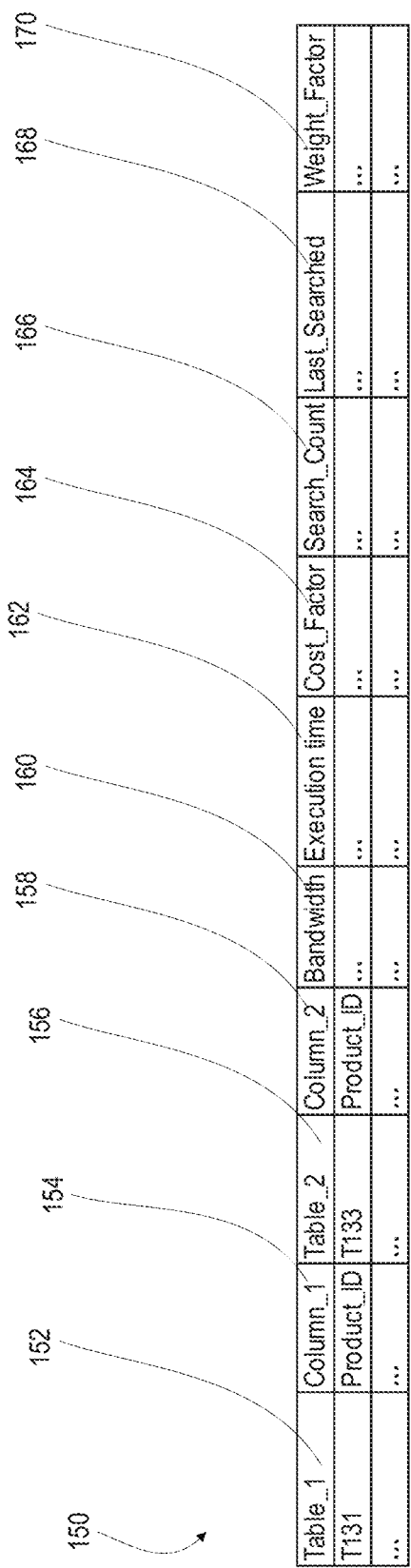
FIG. 6 is a schematic diagram of a workload log of the database system of FIG. 1.

FIG. 6 depicts an example workload log 150 stored by workload monitor 126. As shown, workload monitor 126 maintains a log of statistics relating to each combination of tables and columns used for access requests. Workload log may include first table and column fields 152, 154 for identifying a first table and column used in an access request, and second table and column fields 156, 158, for identifying a second table and column used in an access request. Workload table 150 may further include cost fields 160, 162, 164 for recording the resource cost associated with the access request. Field 160 may contain a measurement of the bandwidth consumed, field 162 may contain a measurement of the execution time, and field 164 may contain an aggregate cost score derived from the cost measurements. Fields 160, 162 may contain averages, estimates or direct measurements based on the most recent search. In some embodiments, fields may be provided for both average cost values and values based on the most recent search.

In an example, the value in Cost_Factor field 160 may be the product of bandwidth and execution time. In other examples, one or both of the bandwidth and execution time may be adjusted by weighting factors. For example, if conservation of bandwidth is a higher priority than minimizing execution time, bandwidth cost may be weighted higher than execution time.

In some embodiments, the value in the Cost_Factor field 160 may be based on a combination of current and historical cost measurements. For example, the Cost_factor may be updated at periodic intervals as follows:

Cost_Factor=cost*(1−sensitivity)+
currentCost*sensitivity where "cost" is the value of Cost_Factor at the beginning of the interval, and "currentCost" is the accrued cost during the interval. The "sensitivity" factor may be between 0 and 1 and may be used to adjust how sensitive the Cost_Factor is to the most recent interval. For example, a sensitivity value of 1 would result in a Cost_Factor identical to the cost accrued in the most recent interval. Conversely, a lower sensitivity would result in the Cost_Factor reflecting cost changes relatively slowly.

Workload table 150 may further include weighting columns 166, 168, 170 for determining the relative importance of each combination of search columns. Field 166 may contain a count of the number of times a particular table and column combination is used for an access request, and field 168 may contain a time stamp of the most recent access request. Field 170 may contain a weighting factor derived from information in the other weighting fields. Workload table 150 may include more or fewer cost fields and weighting fields which may contribute to the calculated cost and weight scores. In some examples, cost and weighting factors may be measured and used to derive cost and weight scores, but only the calculated scores may be stored in workload table 150.

In an example, the weight factor may be initialized at a base value and updated periodically. If a particular table/column combination is used in an update interval, the weight factor may be incremented by a predetermined step size. If not, the weight factor may be decremented by a predetermined step size.

In some embodiments, the value in the weight factor field 170 may be limited to a maximum value and entries may be removed from workload table 150 if the value in weight factor field 170 is below a minimum threshold. For example, the weight factor may be updated in periodic intervals as follows:

```
If (query is executed)
    {Weight = min(Weight + step, maxweight);}
Else
{
    Weight = weight − step;
    If( weight == 0 ) {remove the entry from table}
}
```

Figure 7:
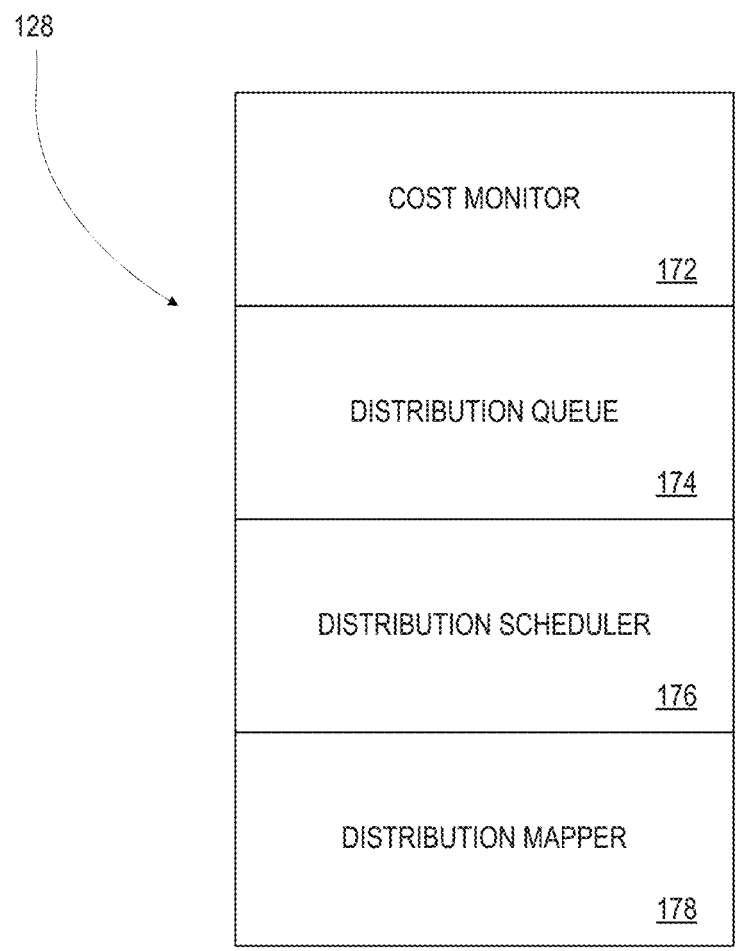
FIG. 7 is a diagram of components of the software of FIG. 4.

Referring to FIG. 7, components of distribution manager 128 are shown in greater detail. As depicted, distribution manager 128 includes a cost monitor 172, a distribution queue 174, a distribution scheduler 176 and a distribution mapper 178.

Cost monitor 172 is configured to periodically scan workload log 150 maintained by workload monitor 126 to identify table/column combinations with high cost or weight factor. Cost monitor may determine, at any given time, whether the current distribution of data in database system 100 is acceptable, or whether a new distribution could potentially provide better performance.

Specifically, cost monitor 172 may calculate a score for each set of search columns in workload log 150 to assess the significance of each combination for overall system performance. This score may in turn reflect the benefit that may be associated with distributing tables on a particular search column combination. The score may be referred to as impact score and may be based on the cost factor and weight factor stored in workload log 150. The calculated performance impact score of each search column combination may be compared to the performance impact of the current distribution columns.

In an example, the performance impact score for search columns t1.c1, t2.c1 may be calculated as the product of weight factor and cost factor, i.e.:

$$\text{Performance\_impact}_{(t1.c1,t2.c1)}=\text{Weight\_Factor}_{(t1.c1,t2.c1)}*\text{Cost\_Factor}_{(t1.c1,t2.c1)}$$

Indices t1.c1, t2.c1 represent the first column of table t1 and the first column of table t2, respectively.

Thus, a frequently-used query with a relatively low cost may have a higher impact than a less frequently-used query with a somewhat higher cost.

Other functions could be used to determine performance impact. For example, in some systems, performance of the most frequently used queries was more important than avoiding any particularly slow-executing queries. In such situations, the performance impact score could be based on a multiple of the weight factor or the square of the weight factor.

Conversely, in other systems it may be more important to avoid particularly slow-executing queries. In such cases, the performance impact could be determined based on a multiple of the cost factor or the square of the cost factor.

Cost monitor 172 may further calculate a performance impact score for the current distribution columns and compare the performance impact of each combination of search columns in workload log 150 to that of the current distribution columns. If the performance impact for a particular search column set exceeds that of the current distribution by more than a threshold value, cost monitor 172 may determine that data should be re-distributed. The threshold value may be referred to as the shuffle cost.

The shuffle cost threshold may be a preset value, which may be controllable by a database administrator. The shuffle cost may depend on the number and size of tables to be re-distributed. In the above example, the candidate would involve only a re-distribution of table t1. In other examples, the shuffle cost threshold may be increased if a candidate distribution would require re-distribution of multiple tables.

A database administrator may be able to scale the shuffle cost threshold in order to tune the frequency of re-distribution. For example, increasing the shuffle cost threshold may reduce the frequency of distribution. A high shuffle cost threshold may be desirable in databases with frequently-changing data sets or workloads, to guard against the system constantly re-distributing tables.

Alternatively, the shuffle cost threshold may be directly measured or estimated based on factors such as system load, amount of data to be distributed, data cardinality and the like. As will be apparent, table statistics such as data cardinality are typically maintained by many database management systems.

For example, cost monitor may perform an evaluation as follows:

```
If (Performance_impact(t1.c2,t2.c1) - Performance_impact(t1.c1,t2.c1) > shufflecost)
{
    use (t1.c2, t2.c1) as the new distribution mechanism
}
``` where t1, t2 represent database tables and c1, c2 represent columns. Tables t1 and t2 are initially distributed on their respective columns c1. The table/column combination t1.c2, t2.c1 corresponds to a query logged in workload log 150 and is a candidate for re-distribution. The difference between the performance impact of the candidate and that of the current distribution represents an estimate of a potential performance gain associated with re-distribution. The shuffle cost threshold represents an estimate of a resource cost for re-distributing data. Thus, data will only be re-distributed if the expected benefit is sufficient to outweigh the expected resource cost.

Cost monitor 172 is configured to enter a re-distribution instruction into distribution queue 174 upon determining that one or more tables should be re-distributed. Distribution instructions may be specific to each table to be re-distributed. That is, if cost monitor 172 determines that two tables should be re-distributed, two separate instructions may be entered into distribution queue 174. In some embodiments, the re-distribution instruction may include a priority indicator for ordering instructions based, for example, on the expected performance gain, the weight factor of a column involved in the re-distribution, or the like.

Distribution scheduler 176 is configured to read instructions from distribution queue 174 and to perform any necessary re-distributions.

Distribution scheduler 176 may be configured to monitor system status, such as system load (e.g. network traffic or computational load), query execution status, in-progress re-distributions and the like. Distribution scheduler 176 may be configured to perform re-distributions in order of priority, and to schedule re-distribution at times of relatively low system load. Distribution scheduler 176 may also be configured so that re-distribution of a table cannot be initiated when another distribution involving the same table is in-progress. Distributions may be completed by sending instructions to database engine 121, as will be apparent to skilled persons.

Figure 8:
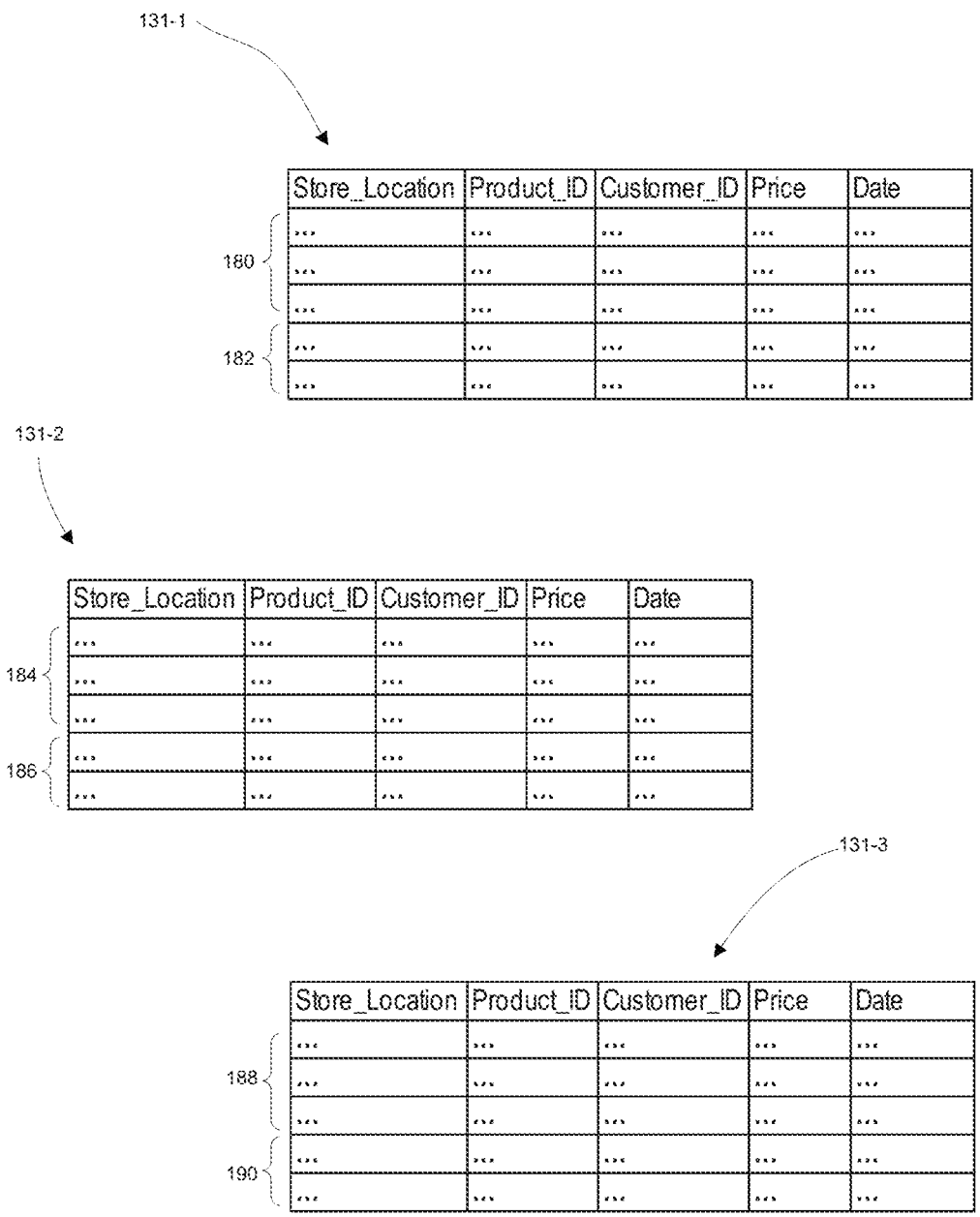
FIG. 8 is a diagram of partitions of a database table.

In some embodiments, re-distributions may be performed in sections. That is, if a table is distributed on column c1 and is to be re-distributed on column c2, distribution scheduler 176 may break the table into partitions having c1 values in defined ranges. Records may then be moved one partition at a time. For example, FIG. 8 depicts portions 131-1, 131-2, 131-3 of table 1, distributed on Product_ID column 136. To distribute table 131 on another column, table 131 may be partitioned into partitions 180, 182, 184, 186, 188, 190. Portion 131-1 is broken into partitions 180, 182; portion 131-2 is broken into partitions 184, 186; portion 131-3 is broken into partitions 188, 190. Partitions 180, 182, 184, 186, 188, 190 may contain rows with increasing ranges of the current distribution column (i.e. Product_ID).

Partitions 180, 182, 184, 186, 188, 190 may be re-distributed one at a time. This may allow queries to continue being executed while data is re-distributed. While data in one partition is being moved, data in other partitions may remain accessible.

Distribution mapper 178 may be responsible for updating data locations and for directing queries received while data is being moved. If a query is received that requires data in a partition that has been moved, the query may be directed based on the new location of the data. Conversely, if the data has not yet been moved, it may be accessed in its old location. For example, any query for data in a range below the partition being moved may be accessed in its new location, while queries for data in a range above the partition being moved may be accessed in the previous location. In some embodiments, data in the partition being moved may also be accessed in read-only mode from its old location. Alternatively, if an access request refers to data in the process of being moved, the access request may fail and be retried until the move is complete, or the access request may be queued until read access is granted. Data in the old location may then be deleted once it is copied to the new location and any pending read access requests have been completed. Example logic for distribution mapper 178 follows:

```
PartitionID = 1; // partition id is 1 based
    While( PartitionID <= maxRangeID )
    {
        Lock(PartitionID, U); // U mode which compatible with S, but
        not X
        Shuffle all tuples in PartitionID;
        Unlock(PartitionID);
        PartitionID++;
        trigger async recycle threads to free old data in this range.
    }
Query:
    myRangeID = rowToRane(rowID);
    if( myRangeID < PartitionID )
    {
        Use new distribution method to get row
    }
    Else
    {
        If( read access )
        {
            // This lock is compatible with the lock in GDCM. It's for
            purpose of drain.
            Lock(myRangeID, S);
```

```
        Use old distribution method to get row
        Unlock(myRangeID);
    }
    Else
        Fail back to retry or wait for lock to be granted;
    }
}
```

Figure 9:
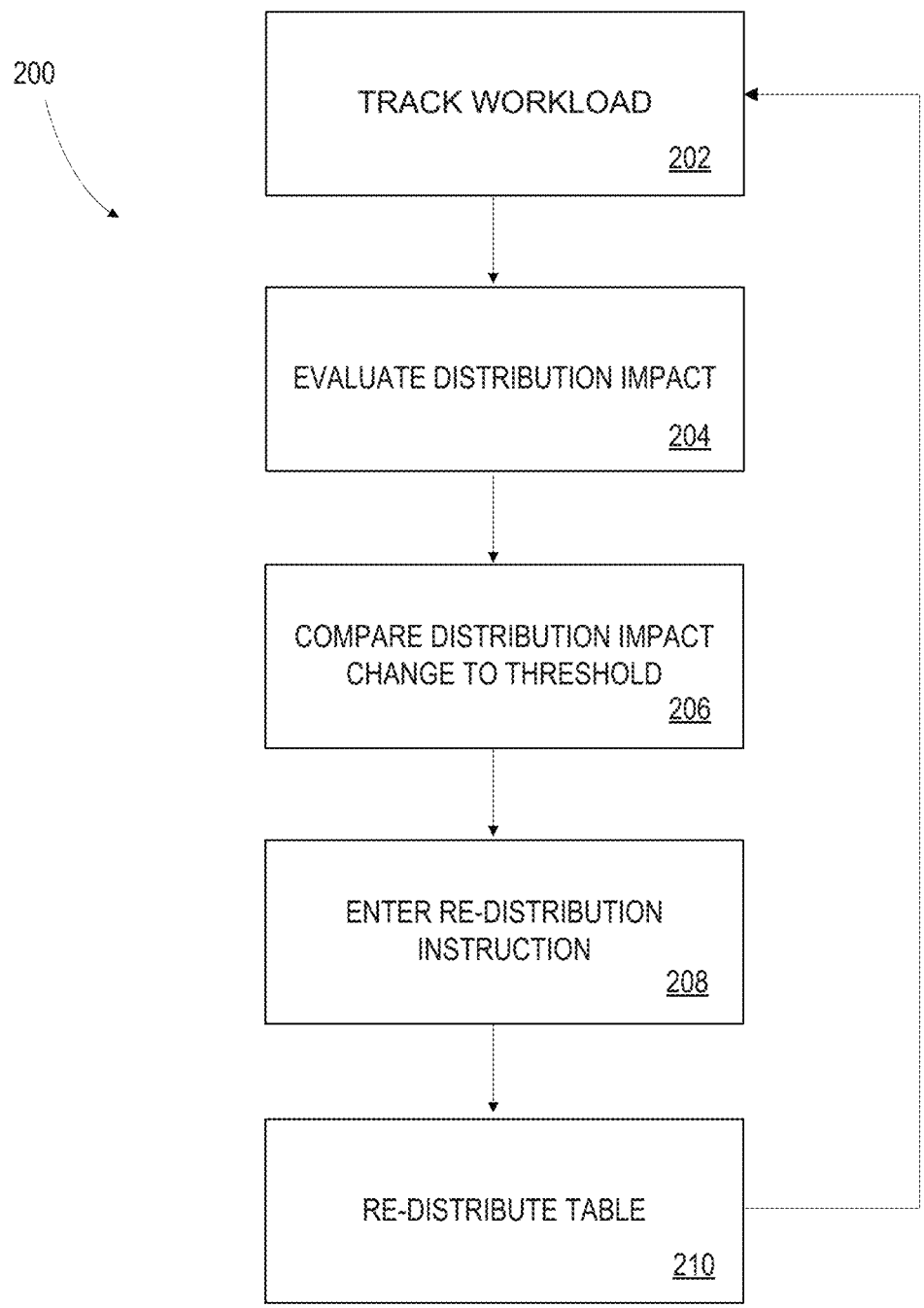
FIG. 9 is a flow diagram of a process of updating data distribution in the database system of FIG. 1.

FIG. 9 depicts a flow chart of a process 200 performed by a server 102 under control of database management system 117 to optimize distribution of tables in database 130.

At block 202, workload monitor 128 monitors access requests received by server 102 and maintains a record of the requests in workload log 150. Each time a request requires searching based on a particular combination of tables and columns, workload monitor 126 updates cost and weight columns in a corresponding row of workload log 150, or appends a new row if no corresponding row is present. Cost columns tracked by workload monitor 126 may include measurements or estimates of the search time, namely, the time elapsed between receipt of the access request and returning of the result, and the network traffic associated with the request. Weight columns tracked by workload monitor 126 may include the a search count and a last searched date and time for searches requiring searching on that combination of tables and rows. Workload monitor 126 may also calculate a cost factor based on the logged cost columns and a weight factor based on the logged weight columns.

At block 204, cost monitor 172 may calculate a performance impact for each combination of tables and columns in workload log 150. The performance impact represents an approximation of a possible performance improvement associated with distributing tables according to each combination of columns. The performance impact may be determined based on a function of weight and cost information from workload log 150. For example, the performance impact may be the product of a cost factor and a weight factor.

At block 206, cost monitor 172 compares each calculated performance impact to a performance impact for the current table distribution, and compares the difference to a shuffle cost threshold representing a minimum performance impact required for re-distribution of a table. The cost threshold may be a preset threshold, which may be selected by a database administrator. Alternatively, the cost threshold may be measured or estimated from system characteristics.

At block 208, if any combination of tables and columns would provide greater than the threshold improvement in performance impact, cost monitor 172 enters one or more instructions into a distribution queue 174. Each instruction may include data identifying a table to be re-distributed, and a column of the table on which the re-distribution is to be based. The instructions may further include priority data, indicating a priority level associated with the distribution.

At block 210, distribution scheduler 176 may instruct database engine 121 to perform re-distribution of one or more tables. Distribution scheduler 176 may scan instructions in distribution queue 174 and perform re-distributions in order of priority. Distribution scheduler 176 may monitor activity of database system, including, for example, network activity, computing load, in-progress access requests and pending or in-progress re-distributions and may schedule re-distribution for a time at which sufficient network and computing resources are available, and no access requests or re-distributions are in progress that involve data to be re-distributed. In some embodiments, distribution scheduler 176 may delay an in-queue distribution instruction until acceptable system conditions occur. In other embodiments, distribution scheduler 176 may select a future time at which it is predicted or known that system conditions will be acceptable.

Figure 10:
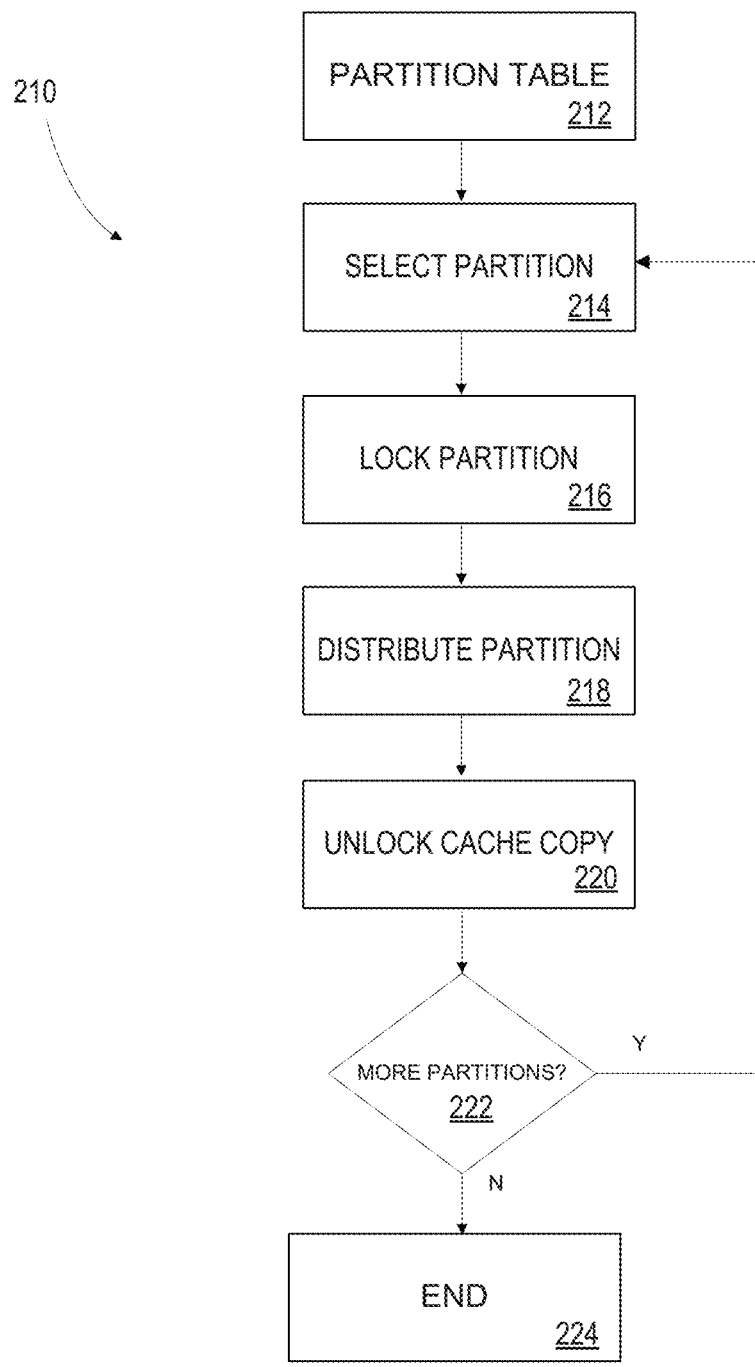
FIG. 10 is a flow diagram of a process of re-distributing a database table.

FIG. 10 depicts a flow chart of a process performed at block 210 by distribution mapper 178 and database engine 121 to re-distribute a table of database 130.

At block 212, the table is partitioned for piece-wise redistribution. Partitions may be defined by ranges of values of the column on which the table is distributed. In an example, the partitions may correspond to table portions stored at each server 102. Alternatively, partitions may be smaller than the table portions, such that a given table portion stored at a given server 102 contains multiple partitions.

At block 214, a partition is selected for re-distribution. Partitions may be re-distributed sequentially, beginning with the partition having the lowest range of values.

At block 216, the selected partition is locked. That is, records falling within the partition are placed in read-only access mode. These records are maintained as a read-only cache accessible during copying of the partition. During movement of the partition, any access requests that relate to records in the partition may be directed to the read-only cache copy.

At block 218, the selected partition is re-distributed. For example, distribution mapper 178 may assign to each of servers 102 a range of values of the new column on which the table is to be re-distributed. Each record within the partition is loaded, its value in the new distribution column is checked, and the record is copied to the relevant server 102.

Distribution mapper 178 maintains a record of the new distribution and a record of the progress of re-distribution. That is, distribution mapper 178 tracks which records have been re-distributed (e.g. the maximum value of the old distribution column that has been re-distributed).

Once all records of the selected partition have been moved to their new locations, and no access requests are pending for the cache copy of the partition, the cache copy of the partition is unlocked at block 220 and queued for deletion.

At block 222, distribution mapper 178 determines if more partitions remain to be moved, and if so, returns to block 214 and selects the next partition. If no further partitions remain to be moved, the process ends at block 224 and repeats for any additional tables to be re-distributed.

Figure 11:
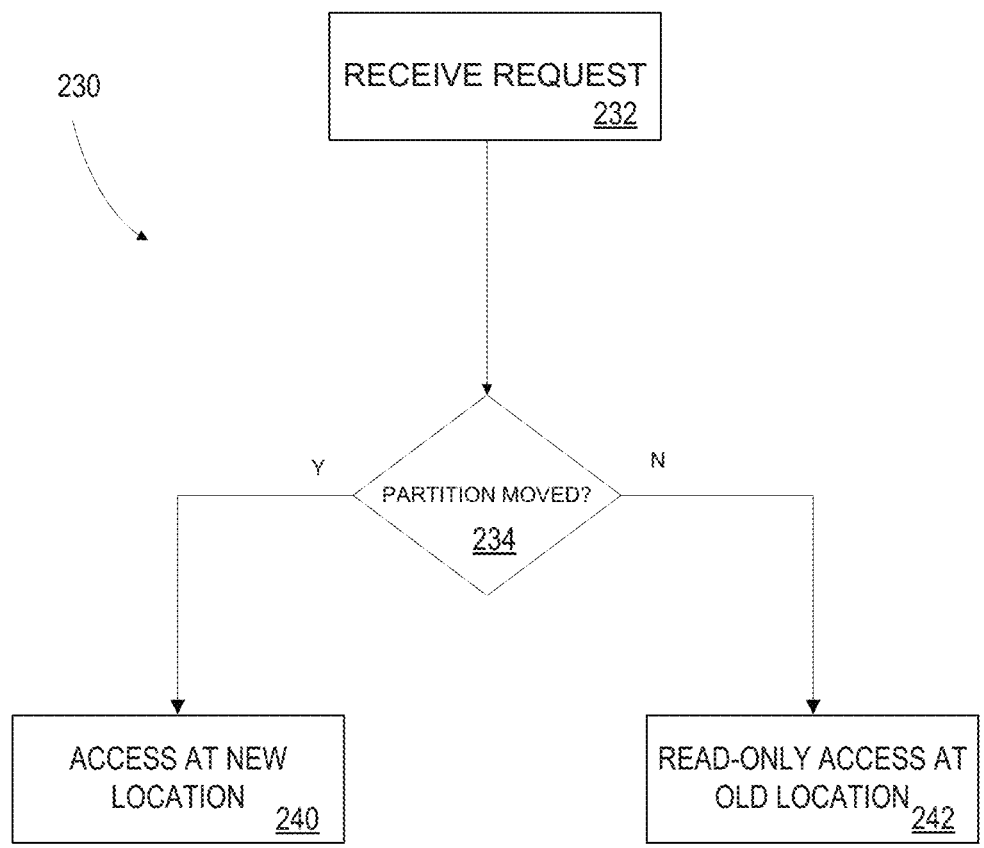
FIG. 11 is a flow diagram of a process of accessing data during re-distribution.

FIG. 11 depicts a process 230 carried out by access manager 124 along with database engine 121 and distribution mapper 178 to access records during re-distribution of a table.

At block 232, access manager 124 receives a request to access data from a table being re-distributed.

At block 234, access manager 124 determines from distribution mapper 178 if the request relates to data in a table partition that has been re-distributed. Specifically, distribution mapper 178 may indicate that the data has been redistributed if its range is below that of the partitions that have been re-distributed. Conversely, if the range of the requested data is above that of the partitions that have been re-distributed, the data is not part of a partition that has been moved. Maintaining a copy of data in its old location for read-only access may be advantages when large partitions are to be moved. Such moves may take considerable time.

Rather than blocking access while the move is carried out, maintaining a read-only copy may allow limited access to data throughout the move.

If the requested data is in a partition that has been redistributed, at block 240, access manager 124 searches for the data in its new (re-distributed) location. If not, access manager 124 searches for the data in its old location.

Figure 12:
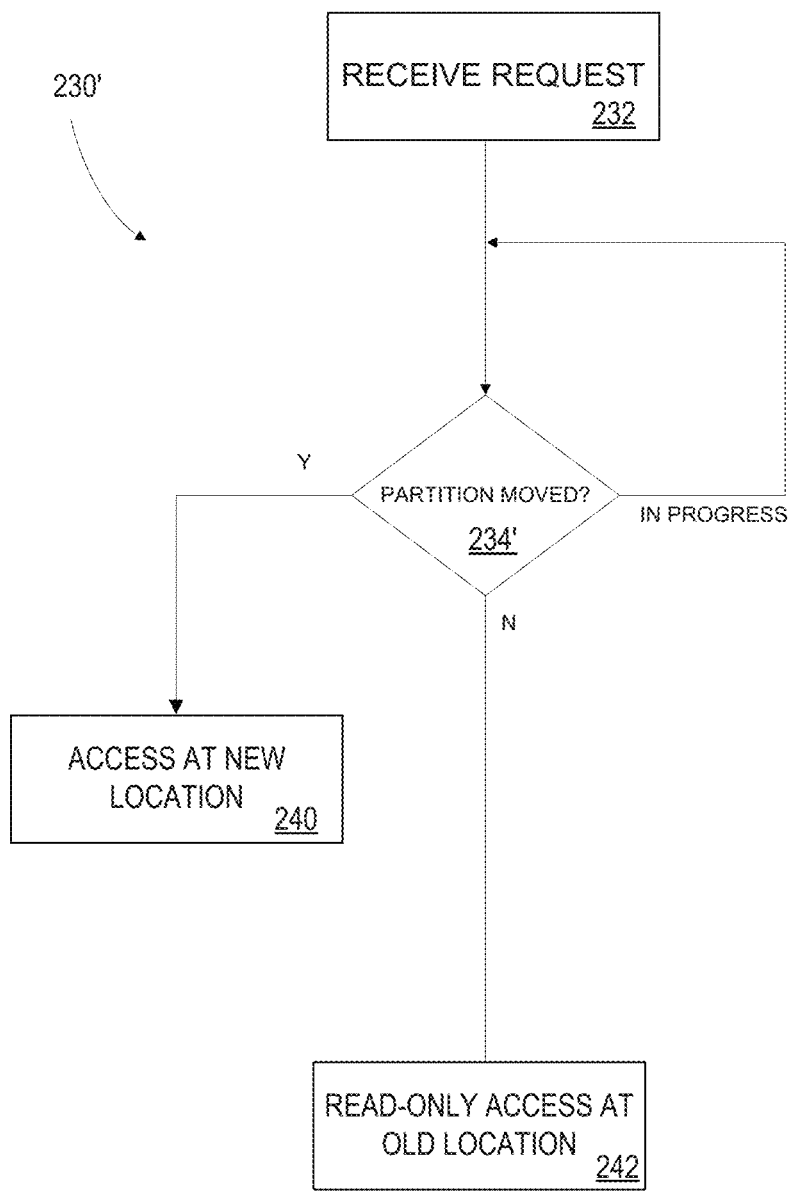
FIG. 12 is a flow diagram of another process of accessing data during re-distribution.

In some embodiments, access manager 124 may determine the range to which an access request applies and compare that range to the range of data that has been moved. FIG. 12 depicts a process 230' exemplary of such embodiments. At block 234', access manager compares the range of data being requested to the range of data that has been moved, in order to determine if the relevant data has been moved, has not been moved, or is in the process of being moved. If the data has been moved or has not yet been moved, the process proceeds to block 240 or 242, respectively. If the data is in the process of being moved, the request may fail and return to retry at block 234'. Alternatively, the request may be queued for release of the requested range.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The invention is defined by the appended claims.

What is claimed is:

1. A database system comprising:
a plurality of servers having interconnected data storage;
a database table having a plurality of rows corresponding to records of a database and a plurality of columns, each record of said database comprising a plurality of fields, each column of said database table corresponding to one of said fields of said records of said database, said records distributed among said plurality of servers according to values in a first column of the plurality of columns;
said servers configured to:
receive a workload comprising requests to access data in said database table;
log resource cost data associated with said requests of said workload in a workload log, the resource cost data including:
a first cost measurement of bandwidth consumed by a first subset of said requests based on said first column, a second cost measurement of bandwidth consumed by a second subset of said requests based on a second column of said columns,
a first cost measurement of execution time for the first subset of said requests based on said first column, a second cost measurement of execution time for the second subset of said requests based on said second column, and
a first aggregate cost score derived from the first cost measurement of bandwidth consumed and the first cost measurement of execution time, a second aggregate cost score derived from the second cost measurement of bandwidth consumed and the second cost measurement of execution time;
based on said resource cost data in said workload log, determine a first performance impact associated with the first column and a second performance impact associated with the second column; and
upon determining that the second performance impact is greater than the first performance impact, re-distribute said records of said database table by re-splitting said records among said plurality of servers according to values of said second column.

2. The database system of claim 1, wherein said servers are configured to re-distribute said records only if said second performance impact associated is greater than said first performance impact by more than a threshold value.

3. The database system of claim 2, wherein said threshold value is based on a resource cost of re-distributing said database table among said plurality of servers.

4. The database system of claim 2, wherein said threshold value is user-adjustable.

5. The database system of claim 1, wherein said servers are configured to log first frequency of access data associated with the first subset of said requests to access data of said workload, and wherein said first performance impact is derived from said resource cost data and said first frequency of access data.

6. The database system of claim 1, wherein said servers are configured to break said database table into a plurality of partitions and re-distribute said records partition-by-partition.

7. The database system of claim 6, wherein said servers are configured to receive a request to access said database table while re-distributing said database table, and to direct said request to a cache copy of one of said plurality of partitions.

8. The database system of claim 6, wherein said servers are configured to maintain a read-only copy of each partition while re-distributing records of the each partition.

9. The database system of claim 1, comprising a priority queue of instructions to re-distribute database tables of said database.

10. The database system of claim 9, wherein said servers are configured to delay re-distributing of the database tables until a period of low system load.

11. A method of re-distributing database tables among a plurality of servers comprising:
receiving a workload comprising requests to access data in a database table, said database table having a plurality of rows corresponding to records of a database and a plurality of columns, each record of said database comprising a plurality of fields, each column of said database table corresponding to one of the fields of said records of said database, said records distributed among said plurality of servers according to values in a first column of the plurality of columns;
writing resource cost data associated data associated with said requests of said workload to a workload log, said resource cost data including:
a first cost measurement of bandwidth consumed by a first subset of said requests, a second cost measurement of bandwidth consumed by a second subset of said requests based on a second column of said columns, a first cost measurement of execution time for the first subset of said requests based on said first column, a second cost measurement of execution time for the second subset of said requests based on said second column, and a first an aggregate score derived from said first cost measurement of bandwidth consumed and said first cost measurement of execution time, a second aggregate cost score derived from said second cost measurement of bandwidth consumed and said second cost measurement of execution time;

based on said resource cost data, determining a first performance impact associated with the first column and a second performance impact associated with the second column; and upon determining that the second performance impact is greater than the first performance impact, re-distributing said records of said database table by re-splitting said records among said plurality of servers according to values of said second column.

12. The method of claim 11, comprising re-distributing said records only if said second performance impact is greater than said first performance impact by more than a threshold value.

13. The method of claim 12, wherein said threshold value is based on a resource cost of re-distributing said database table among said plurality of servers.

14. The method of claim 12, comprising receiving a user input to adjust said threshold value.

15. The method of claim 11, further comprising:
writing first frequency data associated with the first subset of said requests of said workload to said workload log.

16. The method of claim 15, comprising deriving said first performance impact from said resource cost data and said first frequency data.

17. The method of claim 11, further comprising:
breaking said database table into a plurality of partitions and re-distribute said records partition-by-partition.

18. The method of claim 17, further comprising:
receiving a request to access said database table while re-distributing said database table, and directing said request to a cache copy of one of said plurality of partitions.

19. The method of claim 17, further comprising:
maintaining a read-only copy of each partition while re-distributing records of the each partition.

20. The method of claim 11, further comprising:
writing a re-distribution instruction into a priority queue.

* * * * *